Inventor
F. C. Jearum

July 8, 1947.   F. C. JEARUM   2,423,777
MACHINE OR MECHANISM FOR GENERATING SHAPES
OR PROFILES FOR DIAMONDS AND THE LIKE
Filed Feb. 20, 1946   8 Sheets—Sheet 6

Inventor
F. C. Jearum

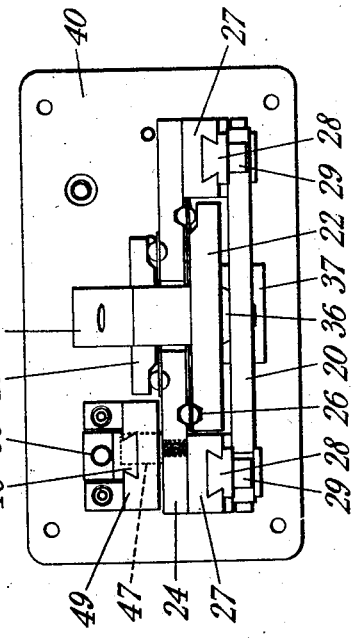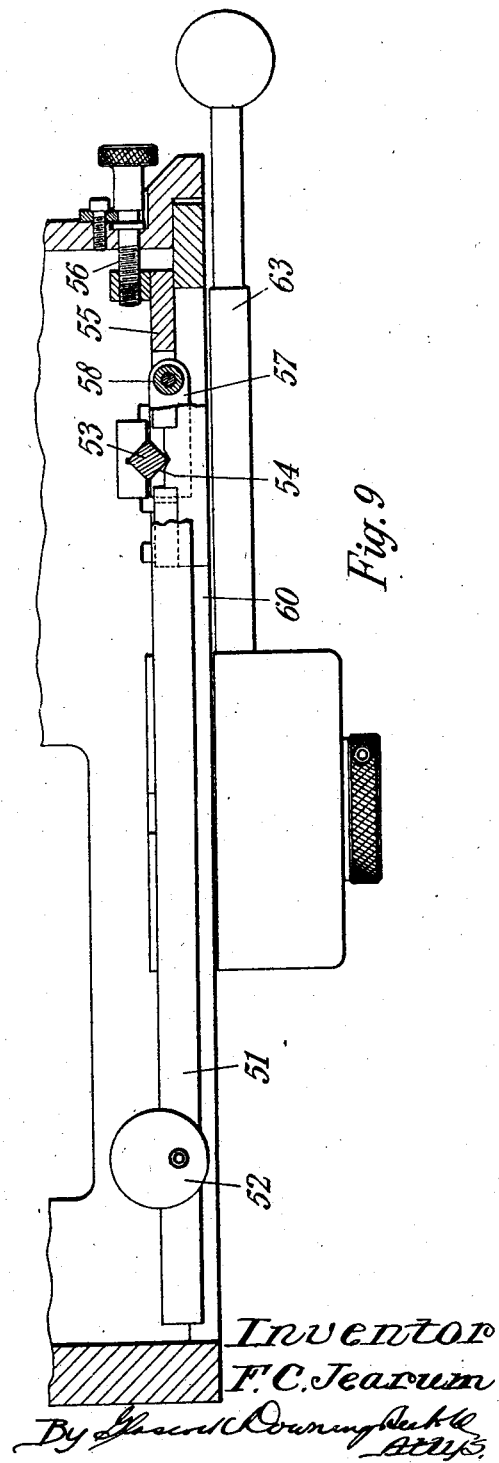

July 8, 1947.  F. C. JEARUM  2,423,777
MACHINE OR MECHANISM FOR GENERATING SHAPES
OR PROFILES FOR DIAMONDS AND THE LIKE
Filed Feb. 20, 1946  8 Sheets-Sheet 8

Inventor
F. C. Jearum

Patented July 8, 1947

2,423,777

UNITED STATES PATENT OFFICE 2,423,777

MACHINE OR MECHANISM FOR GENERATING SHAPES OR PROFILES FOR DIAMONDS AND THE LIKE

Frederick Charles Jearum, Sutton, England

Application February 20, 1946, Serial No. 648,901
In Great Britain February 28, 1945

15 Claims. (Cl. 51—234)

This invention relates to means or mechanism for generating shapes or profiles on diamonds or other stones or minerals or hard metals (hereinafter referred to as stones) for industrial tool work or for the jewelry trade, in machines for cutting, lapping or polishing (hereinafter referred to as lapping), of the type in which the stone is held in a dop carried on a pivoted radial arm which is capable of oscillation to give the dop an arcuate path of movement in a plane normal (or at a sutable angle) to the lapping plane of a rotary cutting disc or lap against which the stone is treated for generating the convex arcuate or faceted shape or profile required, and the present invention is concerned with producing modifying displacements of the pivot of the radial arm calculated to alter said arcuate path for the generation of the predetermined form upon the stone.

In my prior British patent specification No. 565,399 is described a machine or mechanism of the above type comprising dop mounting means carried on a radial arm capable of oscillation in a predetermined arcuate path and having modifying means, including a former and a linear abutment, capable of automatically effecting, during oscillation, a predetermined displacement of the dop mounting means along the radial arm with respect to the pivotal axis of the radial arm and towards or away from the lapping plane, to alter the said path so as to afford cutting contact loci as determined by the modifying means; and in my British patent specification No. 9112/44 modifying means (including a former such as a cam) are described which are adapted to displace the pivotal axis of oscillation of the radial arm carrying dop mounting means towards and away from the lapping plane as determined by said means for the generation of the desired shape or profile in the stone under treatment. In the specification last mentioned is also described bearings for the pivot spindle of the radial arm carried in a table mounted on parallel link suspension means capable of enabling the table and spindle to be displaced in a path normal to the lapping plane.

The object of the present invention as compared with the mechanism described in my prior specifications numbered as above is to provide improved or alternative modifying means concerned in the generation of stone shapes or profiles, and in particular to provide improved means operating in conjunction with a former which are adapted to reduce modifying displacements of a mechanically appropriate ambit to an order suitable for the dimensions of the stone to be treated or to impose on said reduction further modifications; and a further aim of the invention is to provide an automatic control adapted to generate a profile (which may be called a blended facet) consisting, as viewed in plan, of a rectilinear edge or facet merging longitudinally in both directions into true radiussed portions.

A further object of the invention resides in the provision of means whereby in the oscillation by hand of the radial arm the zero position at right-angles to the lapping plane can be detected by feel, or in other words, to provide mechanism which establishes a stable position for the radial arm at zero, and where movement therefrom in either direction offers a slight but distinct resistance.

The invention consists in a machine or mechanism of the type described or of the character indicated in my prior British patent specification No. 9112/44 wherein a former oscillable with the radial arm produces modifying displacements in a cooperating transmission member on a carriage mounted for movement on defined paths parallel with and normal to the lapping plane which are converted into displacements normal to said plane applied to the pivot of the radial arm in reduced ratio appropriate for the dimensions and shape or profile of the stone under treatment.

By the term "former" as referred to in the preceding paragraph and hereinafter is meant a device having an actuating surface (such as a cam) or a roller arrangement offset from the axis of oscillation, calcaulated to produce that displacement of the transmission member which is predetermined for the modification of the arcuate path of the dop (due to its oscillation about the pivot of the radal arm) necessary for the predetermined shape or profile to be generated.

According to one application of the invention the modifying means comprise: a former consisting of a spaced roller (or rollers) mounted on a radial plate or offset member fixed or operatively connected to the pivot spindle on which the radial arm is mounted, cooperating with a transmission member which may be in the form of a rectilinear face or bar mounted on a carriage displaceable in a pair of paths, one parallel to the lapping plane and the other normal thereto, the latter being also that of the table; and a follower on the transmission member carriage engaging a reducing linear abutment along which the follower is impelled to and fro as the radial arm is oscillated, by the operation of the former upon the transmission member, the displacements normal to the lapping plane being applied through the carriage to the pivot spindle of the radial arm.

The reducing abutment which conveniently is a rectilinear bar is mounted for angular adjustment so that it may be variably inclined with respect to the lapping plane for the purpose of varying the ratio of reduction of amplitude of the displacements of the transmission member.

The displacement of the pivot spindle may be positive in both directions but it is preferred to provide a gravitational force constantly tending to urge the spindle, and hence the dop, towards the lapping plane, in which case the former effects a constraint upon the gravity action.

According to an ancillary feature of the invention the former comprises a pair of spaced rollers or contact surfaces positioned parallel to the longitudinal axis of the radial arm so that when such axis is normal to the lapping plane (i. e. the zero position) both rollers simultaneously engage the transmission member with the result that the radial arm is stabilised at the zero position and movement thereof in either direction immediately causes one or other of the rollers to effect a displacement of the member, such displacement being detectable by the operation in manipulation.

The nature of the invention will be further set forth in the accompanying description of an example of a mode of the carrying of the invention into effect in applying the improved modifying means to a machine the construction of which is in substance the same as that described in my prior British patent specification No. 9112/44.

In the accompanying drawings:

Fig. 8 is an end elevation of the control block assembly.

Fig. 9 is a sectional elevation of the counterbalancing mechanism.

Figure 1:
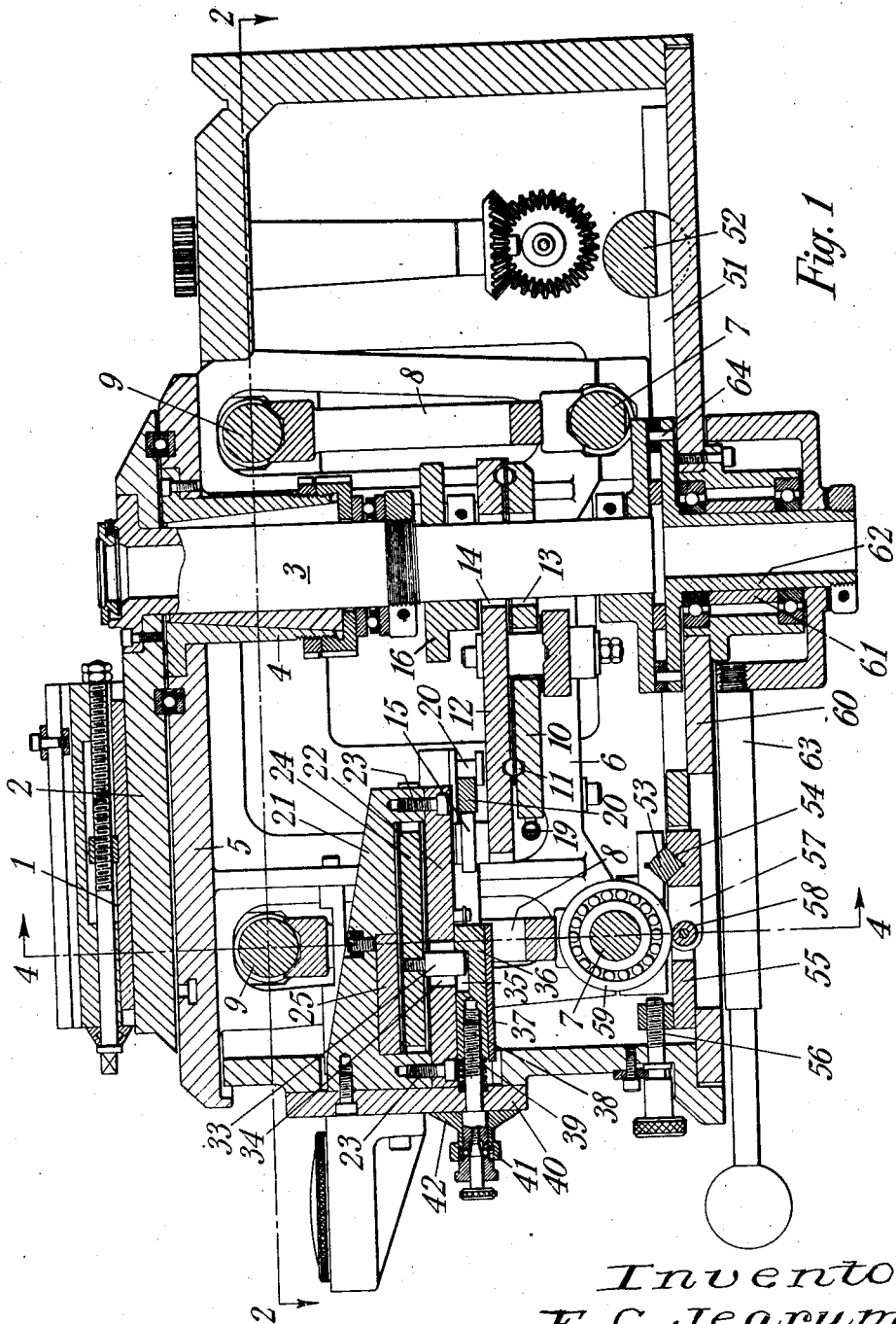
Fig. 1 is a sectional elevation of a machine according to the invention taken on the line 1—1 of Fig. 2.
Figure 2:
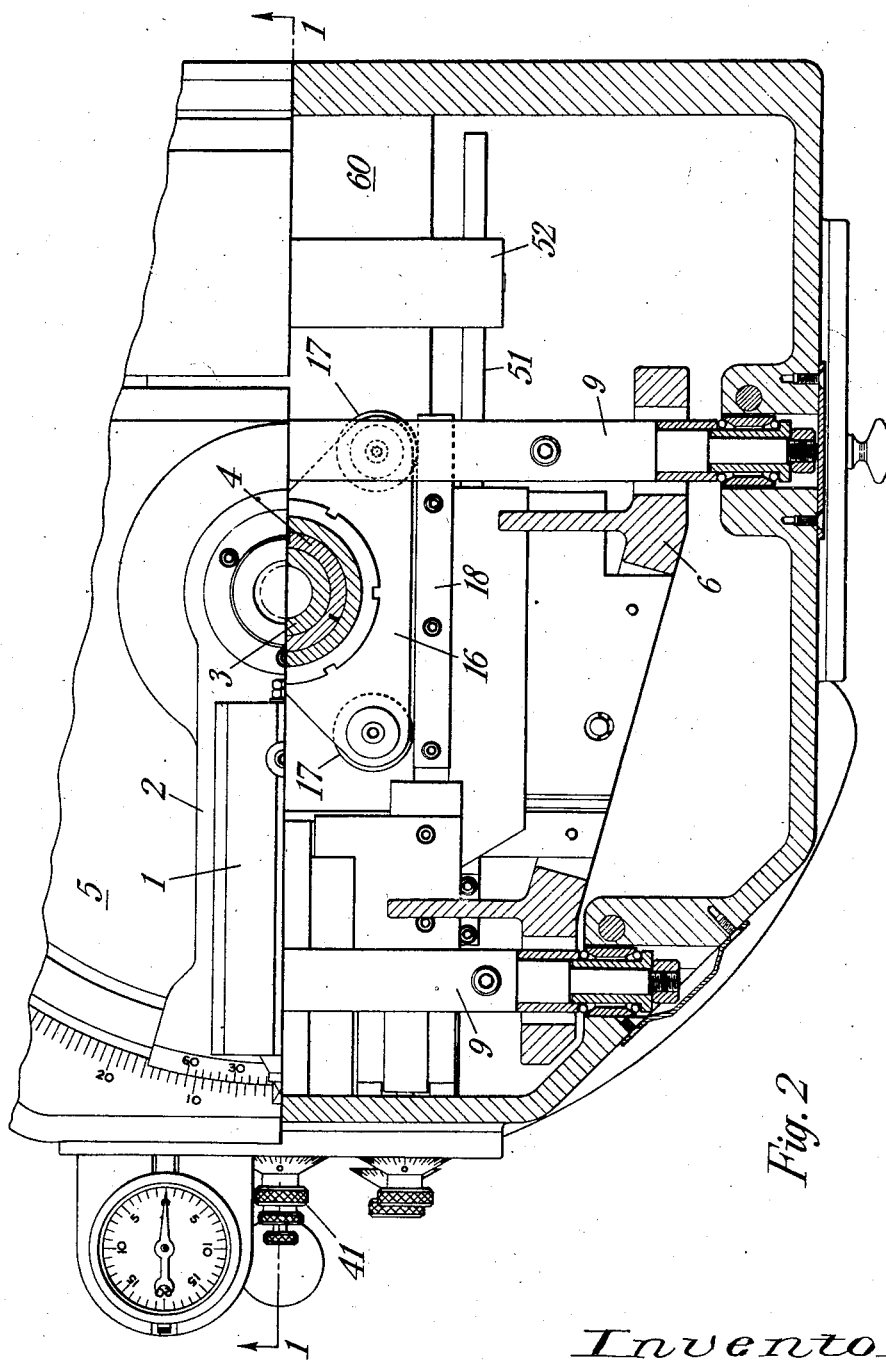
Fig. 2 is a partial plan partly in section on the line 2—2 of Fig. 1.
Figure 3:
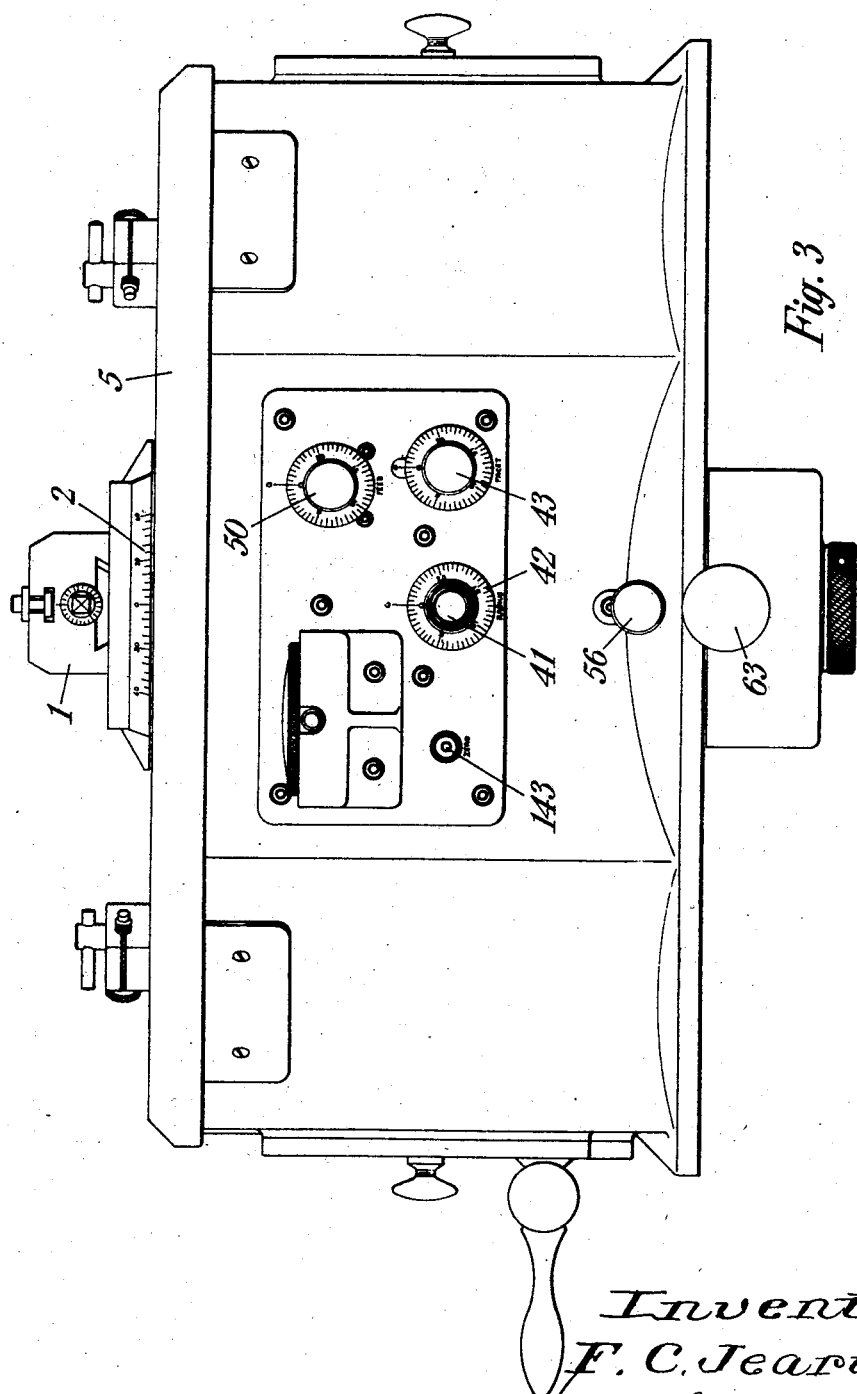
Fig. 3 is a front elevation.
Figure 4:
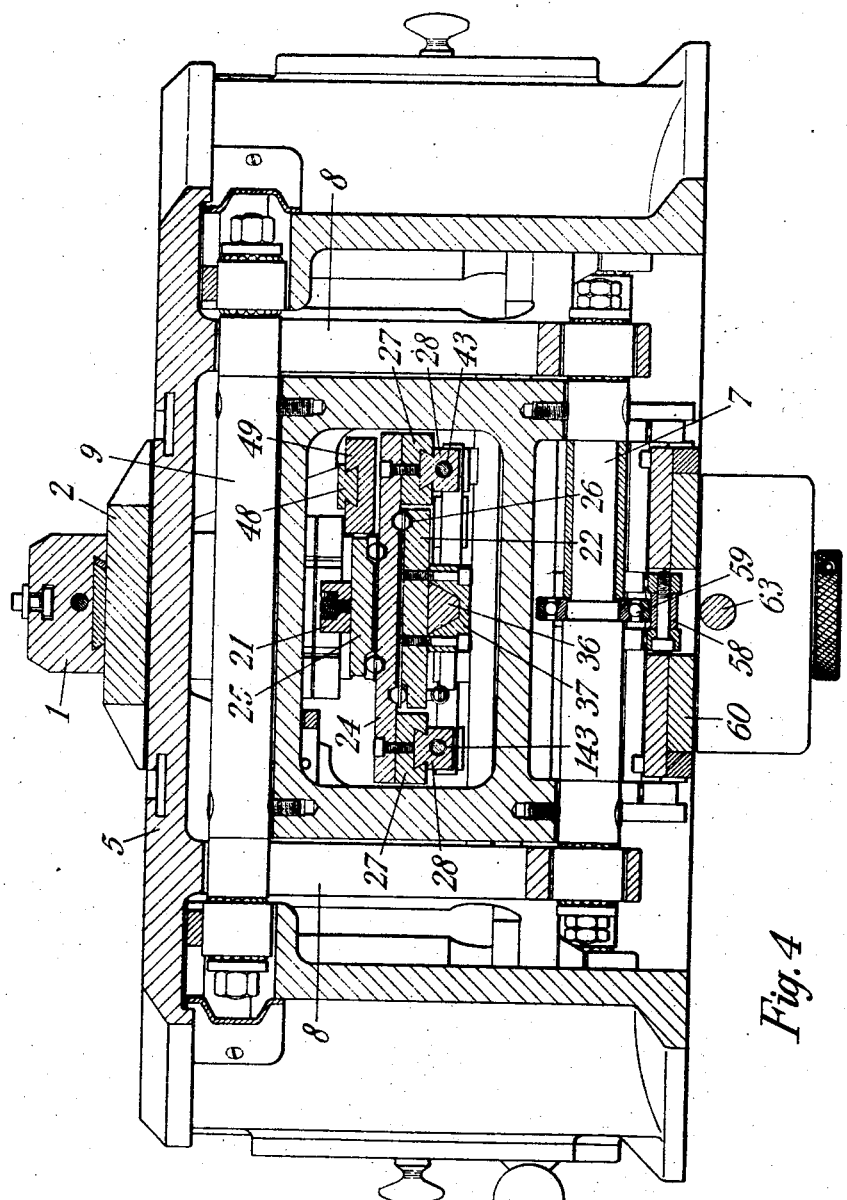
Fig. 4 is a sectional elevation on the line 4—4 of Fig. 1.
Figure 5:
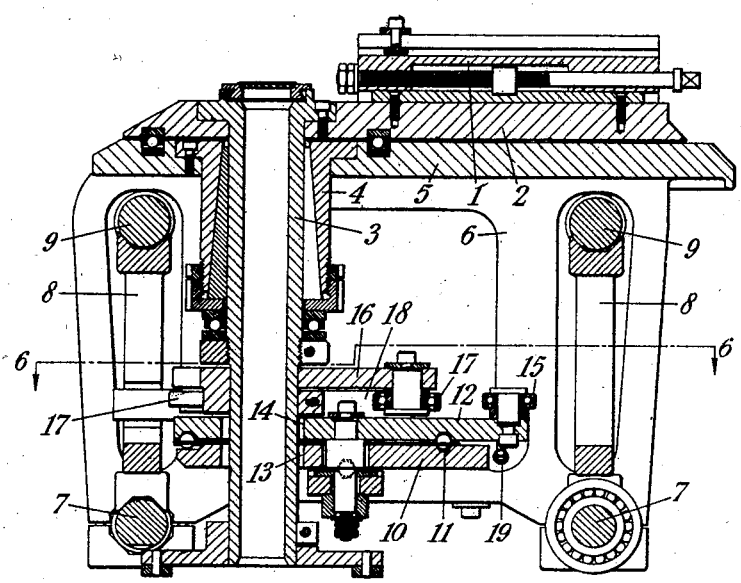
Fig. 5 is a sectional elevation of the carrier plate assembly.
Figure 6:
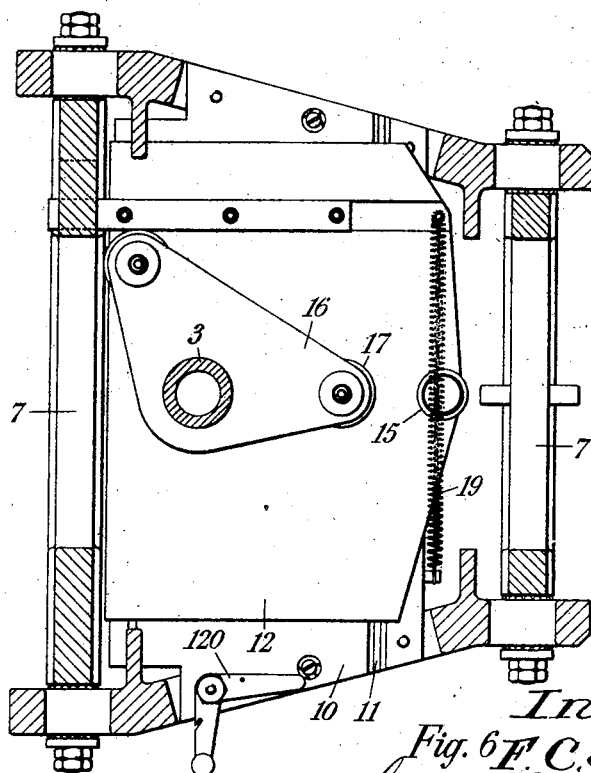
Fig. 6 is a half plan in section on the line 6—6 of Fig. 5.
Figure 7:
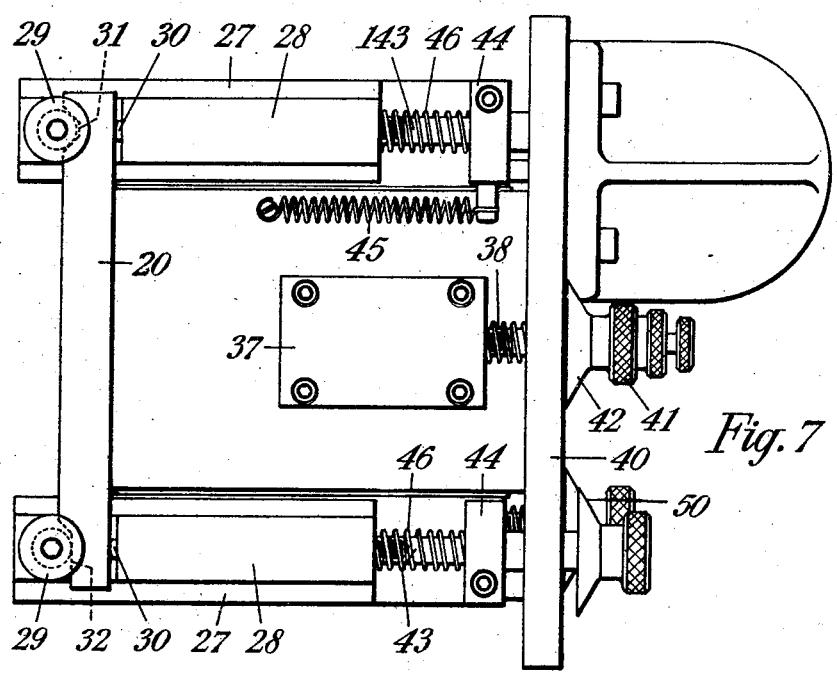
Fig. 7 is an inverted plan of the control block assembly.
Figure 10:
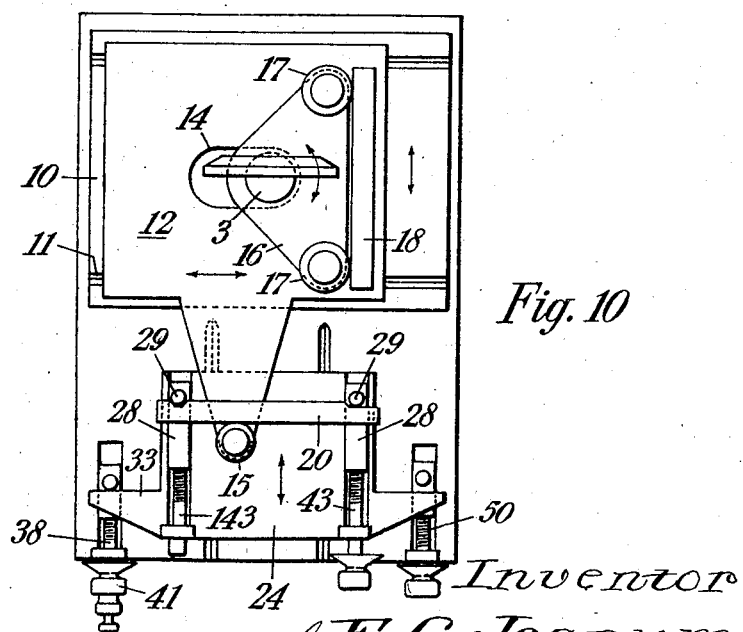
Figs. 10-14 are diagrams illustrating various operative positions of the parts.
Figure 11:
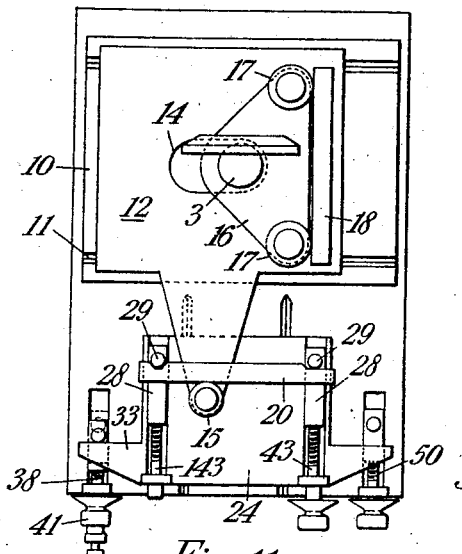
Figure 12:
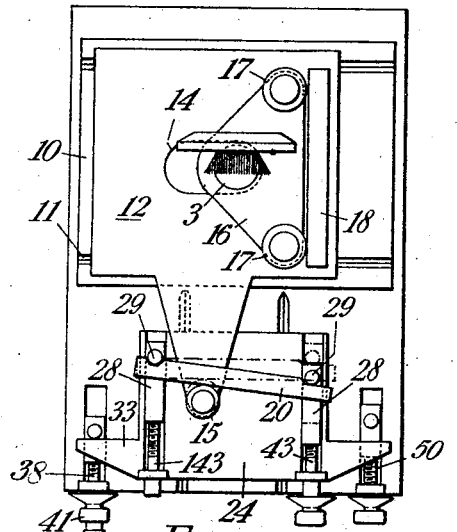
Figure 13:
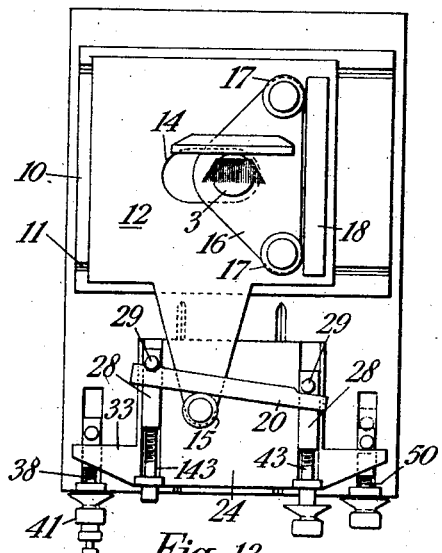
Figure 14:
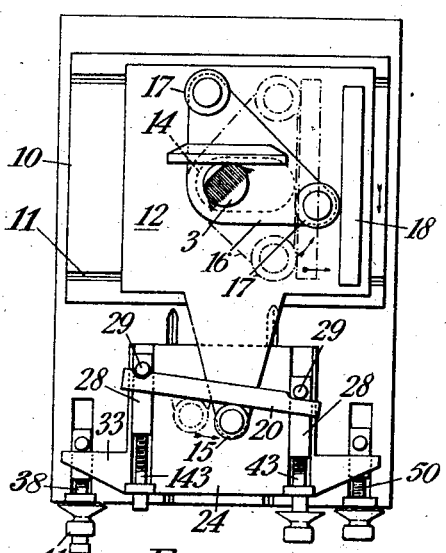

In carrying out the invention for the generation of a blended facet tool a dop (not shown) is mounted in adjustable means 1 upon the radial arm 2 of the machine and the pivot spindle 3 of the radial arm is mounted in bearings 4 in a platform or table 5 supported in the parallel link suspension means comprising side frames 6 mounted upon lower shafts 7 which are carried by suspension links or frames 8 from upper shafts 9 mounted in ball bearings from the casing. Between the side frames 6 or cross leg-bracing of the table link suspension a bed 10 is fixed which has a geometric slideway 11, parallel with the lapping plane, on which a carriage plate 12 in the form of a plate or frame is adapted to slide. The bed 10 and the carriage plate 12 have apertures 13, 14 which are penetrated by the pivot spindle 3 of the radial arm. The aperture 14 in the carriage plate 12 being in the form of a slot, parallel to the lapping plane, extends longitudinally to give a clearance between the spindle 3 and the slot ends so that the carriage plate 12 may move freely in a path parallel with the lapping plane. Translational movement of the carriage plate 12 normal to the lapping plane will impart a corresponding displacement to the spindle 3 through the bed 10, link suspension 8 and table 5; thus displacing the axis of oscillation of the radial arm 2 towards and away from said lapping plane.

Modifying means controlling the movements of the carriage plate 12 parallel with the lapping plane and converting such movements into displacements on a reduced scale normal to said plane, are described hereinafter.

The carriage plate 12 supports, or has an extension supporting, a follower roller 15 which is disposed with its axis at right-angles to the plate and which is located on the side of the pivot spindle 3 away from the lapping plane, the function of this roller being referred to hereinafter.

Adjacent the carrier plate 12 and parallel therewith a triangular former plate 16 is mounted fixedly on the pivot spindle 3, the base of the triangular plate being located away from the spindle axis. Towards each of the base angles of the plate a roller 17 is mounted on an axis vertical to the plate, the arrangement being such that the spindle axis constitutes the apex, and the axes of the two rollers 17 the angular points of an isosceles triangle the base of which is parallel with the central longitudinal plane of the radial arm 2.

In a plane normal to the lapping plane and spaced from the pivot spindle axis, a rectilinear transmission member in the form of a bar 18 is secured upon the carriage plate 12 and so that the arcs of oscillation of both former rollers 17, derived from the pivot spindle movement, intersect the bar in the normal position of rest of the carriage plate and engage the bar simultaneously.

The carriage plate 12 is urged by spring means 19, connected to it and to the bed 10, to maintain the transmission bar 18 in contact with the former rollers 17. In order to enable the drive from the rollers 17 to the transmission bar 18 to be disestablished, a manipulable bell-crank lever 120 or toggle is pivotally mounted on the bed 10 and is adapted to push the carriage plate 12 along its slideway and displace and temporarily maintain the transmission bar out of the arcs of movement of the former rollers; in which condition the radial arm is capable of oscillation free of the influence of the modifying means for any of the usual generating operations for which it is suitable.

Oscillation in either direction of the pivot spindle 3 causes one or other of the former rollers 17 to propel the transmission bar 18 away from the axis of the pivotal shaft; and conversely the rollers 17 control the return of the transmission bar towards the pivotal shaft axis under the spring means 19 acting on the carrier plate. By this arrangement, when the radial arm 2 is oscillated, a reciprocation of the carriage plate 12 along the slideway 11 of the bed 10 will take place. This movement is permitted by the slot 14 in the carrier plate in which the pivot spindle 3 is accommodated and is converted into a displacement normal to the lapping plane as described hereinafter.

The former plate 16 and rollers 17 are arranged with the right bisector of the base (between the axes of the rollers) passing through the axis of the pivot spindle 3 and at right-angles to the central longitudinal plane of the radial arm 2. When this central plane is normal to the lapping plane the straight line joining the axes of the former rollers 17 will be parallel to the transmission bar 18 and the periphery of the rollers 17 both engage the transmission surface of said bar. As this surface is resiliently urged into contact with the rollers 17 by the spring means 19 referred to above it will be appreciated that the rollers and transmission bar engagement will establish a stable zero position for the radial arm 2, disturbance from which in either direction of oscillation will do work on the transmission bar and hence can be detected by feel by an operator manipulating the radial arm.

Turning now to the description of the means for converting the reciprocation of the carriage plate 12 into displacements normal to the lapping plane, the follower roller 15 which, as above indicated, is supported upon the carriage plate, is acted upon by an abutment bar 20 having a track or face along which the follower is adapted to roll. This bar is located in a plane normal to the lapping plane and at right-angles to the pivot spindle axis and is transversely inclinable to the normal to the lapping plane which intersects the pivot spindle.

For convenience in describing the conversion means and adjustment devices associated therewith, "vertical" and "horizontal" will be used for denoting the positions of various parts, the term "vertical" being used for directions parallel with the pivot spindle axis of the radial arm and "horizontal" for directions at right-angles thereto.

Upon the casing or other fixture at the front of the machine a vertical bracket 21 is secured and extends radially towards the pivot spindle axis. Beneath this bracket 21 and fixed thereto by screws 23 is a horizontal mounting plate 22. The bracket 21 is recessed over the mounting plate to accommodate a horizontal abutment carrier plate 24 and a cover plate 25. The abutment carrier plate 24 is adapted to be slid horizontally towards and away from the lapping plane on geometric slideways 26 located between the mounting plate 22 and the underside of the abutment carrier plate, said carrier plate being held down by the cover plate 25 between which and the abutment carrier plate 24 there are also geometric slideways.

On the undersurface and at each side of the abutment carrier plate 24 a dovetailed slideway 27 extends parallel with and equally spaced from the plane which is normal to the lapping plane and which also contains the axis of the pivot spindle. Slider bars 28 are mounted on the dovetailed slideways and each carries a headed abutment pin 29. In a recess in front of each pin and held against the body of the pins by spring pressed plungers 30 are the ends of the abutment bar 20. One of these pins 29 engages the bar in a V-shaped notch 31 and is adapted to act as a fulcrum pivot for inclination adjustments of the abutment bar effected by displacements of the other pin 29 which lies against a recessed flat 32 of the opposite end of the abutment bar.

The abutment pins 29 and their sliders 28 are located so that the distance between the vertical planes of the sliders passing through their pin axes is equal to the distance between the axes of the rollers 17 carried by the former plate 16, and, when the radial arm 2 is in the zero position at right-angles to the lapping plane, the distance between the vertical plane (normal to the lapping plane) of the axis of the fulcrum pin and a similar vertical plane containing the axis of the follower roller 15 is equal to the perpendicular distance of the pivot spindle axis from the triangle base line joining the axes of the former rollers.

The abutment carrier plate 24 is adjustable horizontally towards and away from the lapping plane for giving an adjustment displacement of the abutment bar as a whole for presetting the distance of the stone from the lapping plane or presetting the distance the stone can be fed inward during a lapping operation. In the present instance, where the generation of a blended facet is under consideration, the abutment carrier plate is set back the appropriate distance for determining the radius of the radiussed portions which lie at the ends of the rectilinear facet of the blended facet form. The adjustment of the carrier plate 24 is effected by providing a depending pin 33 therefrom which passes through a slot 34 formed in the fixed mounting plate 22 and has its end engaged in a longitudinal slot 35 formed in a central slide 36 beneath the vertical bracket and engaging a slideway 37 secured to the underside of the mounting plate 22. The slot 35 provides for a margin of movement for the depending pin 33 and the front of the slot acts as a limit stop for the inward feed of the carrier plate 24 and abutment bar 20. A micrometer screw 38 surrounded by a helical spring 39 abutting against a bearing 40 for the screw, is engaged in a screwthreaded bore in the slider 36 and operated by a milled head 41 with reference to a graduated dial 42 at the front of the casing. This screw 38 may be conveniently referred to hereinafter as "the radius screw."

Each abutment pin slider 28 is operated by a micrometer screw 43, 143 which enters a longitudinal screwthreaded bore in its slider. The shanks of the micrometer screws are mounted in bearing brackets 44 fixed to the abutment carrier plate 24, to one or both of which is anchored a tension spring 45 attached to the mounting plate 22 so that the carrier plate is resiliently urged towards the lapping plane. The micrometer screw shanks are surrounded by helical springs 46 which operate between the bearings 44 and the ends of the sliders 28.

The micrometer screw 143 for the fulcrum pin slider is preferably operable by a key and this screw is for positioning the fulcrum pin and adjacent end of the abutment towards or away from the lapping plane to set the abutment bar parallel with the lapping plane in which position, it will be manifest, the effect of the bar upon the reciprocations of the follower roller 15 will be zero; hence the screw which affects this adjustment may be called "the zero screw." No graduations need be provided for reading the adjustment of this screw as the correct position will be indicated by a dial micrometer operating against an arm projecting from the table and adapted to show deflection whenever the table moves away from the lapping plane.

The other micrometer screw 43, which adjusts the slider carrying the abutment pin the displacement of which alters the inclination of the abutment bar 20, is for determining the amount of reduction of the displacements effected by the former rollers 17 in the transmission bar and for determining the facet width between the radiussed portions of a blended facet upon a stone, This micrometer screw may be referred to as "the facet screw."

In order to control the inward feed of the table and stone during the lapping operation the carrier plate 24 has an upstanding pin 47 in the path of a slider 48 operating on a slideway 49 secured to the casing or on the fixed mounting plate, so that when the slider 48 is retracted by a graduated micrometer screw 50 (referred to as "the feed screw") it engages the upstanding pin 47 to draw back the carrier plate 24 an appropriate amount for the required inward feed which is terminated when the pin 33 on the underside of the carrier plate 24 is stopped by the end of the slot 34 in the radius screw slide 36.

The primary function of the abutment bar 20 is to provide a means for converting the motion of the transmission bar carriage 12 (parallel with the lapping plane) into motion normal to the lapping plane on a reduced scale, the order of reduction being determined by the presetting of the inclination of the abutment bar 20 by the facet screw 43. For example, if this screw 43 is set back to incline the abutment bar 20 at a slope of 1 in 16 with reference to a plane parallel to the lapping plane, the screw will have to be screwed out ¼-inch (since the distance between the axes of the two abutment pins is 4 inches). Then the converted movement of the table 5 and the axis of the pivot spindle 3 of the radial arm 2 will be $\frac{1}{16}$ of that of the carriage. Similarly, if the said micrometer screw 43 is screwed out ⅛" the slope or incline of the abutment bar 20 will be 1 in 32, and the movement of the table 5 will be $\frac{1}{32}$ of that of the carriage. As the distance between the axes of the two former rollers 17 is also 4", and if the facet screw 43 is screwed out ⅛", then the movement of the table 5 will tend to form a blended facet with a centre distance of the radii of the two radiussed portions equal to $\frac{1}{32}$ of the centre distance of the former rollers, which is ⅛". Thus, the micrometer screw 43 gives a direct setting for the facet width of a blended facet.

The secondary function of the abutment bar 20 is to bring the table 5 back an amount proportional to the facet width, the proportion being the same as that between the perpendicular distance of the pivot spindle axis from the triangle base between the axes of the two former rollers 17 and the centre distance (distance between the roller axes) of the two rollers. For example, if the facet screw 43 is screwed out ¼-inch (if the abutment bar 20 is inclined leverwise on its fulcrum pin 29 and pulls the table back from the lapping plane by the thrust of the bar on the follower roller 15. Since the distance between the line of motion of the follower roller 15 and that of the fulcrum pin axis is equal to the perpendicular distance of the axis of the pivot spindle 3 from the triangle base line joining the axes of the former rollers 17 (which is in the present instance 1¼") then the distance the table 5 will move will be $$\tfrac{1}{4}'' \times \frac{1\tfrac{1}{4}''}{4} = \tfrac{5}{64}''$$

thus 5/64" is to ¼" as 1¼" is to 4".

As the radial arm 2 and dop mounting enables the stone to be rotated by an axis in or parallel to the lapping plane and the conversion mechanism allows the axis of rotation to move in a line normal to the lapping plane, then it will be apparent that in order to generate a blended facet the stone will have to be moved either towards or away from the lapping plane at the same time as it is rotated, with a definite relationship between the two motions. This relationship will be governed by the facet width and the position of the axis of rotation of the stone relative to the centres of the radii of the blended facet form. The magnitude of the radii of a blended facet form does not influence this relationship. As the modifying mechanism comprises the two former rollers 17 which are rotated about the axis of the pivot spindle 3 of the radial arm 2, it follows that the motion of the transmission bar carriage 12 will have a similar relationship with the rotation of the pivot spindle 3 but governed by the distance apart of the axes of the former rollers 17 and the position of the axis of the pivot spindle relative to such rollers.

For convenience, the axis of the pivot spindle 3 passes through the right bisector of the triangle base line of the former roller axes. It also follows that the motion of the table 5, and consequently the stone, will not only be similar to that of the carriage 12 in relation to the rotation of the pivot spindle (since the axis of the pivot spindle is also the axis of rotation of the stone) but the said motion will be in the same proportion to the facet width as the motion of the carriage is to the distance between the axes of the former rollers.

The primary function of the abutment bar 20 as has already been indicated is to fulfil this condition. The other condition which requires that the axis of rotation of the stone must be in a similar position relative to the centres of the two radii forming the blended facet as the pivot spindle axis 3 is to axes of the former rollers 17, is fulfilled by the secondary function of the abutment bar in this that: if the stone is set up so that the axis of rotation of the shaft of the pivot spindle 3 passes through the centre line of the stone, and the line of the centres of the two radii of the blended facet to be formed is parallel to the lapping plane when the triangle base line of the former rollers 17 is parallel to the transmission bar 18, then the axis of the pivot spindle will be retracted a distance proportional to the facet width by the setting of the facet screw 43; so that the axis of rotation of the stone will pass through the right bisector of the line of centres of the two radii to be formed at a distance from the point of intersection in the same proportion to the facet width as the perpendicular distance between the pivot spindle axis and the triangle base line is to the distance between the axes of the former rollers 17.

The adjustment operations for setting the modifying means for a blended facet is as follows. Assuming the abutment bar 20 to be in the zero position parallel with the lapping plane, as adjusted by the zero screw 143, and so that the axis of the pivot spindle lies in the lapping plane, as set when the radius screw 38 reads zero: the length of the radii for the blended facet is set by operating the radius screw to retract the carrier plate 12, abutment sliders 28 and abutment pins 29 as a whole together with the follower roller 15, carriage 12, table 2 and stone, the requisite distance for the chosen radius.

The facet width is then set by manipulating the facet screw 43 to incline the abutment bar 20 and retract the table and stone a further predetermined distance such that the distance between the rotation centre of the diamond and the line of centres of the two radii to be generated will be in the same proportion to the centre distance of the two radii (i. e. facet width) as that between the perpendicular distance between the pivot spindle axis and the triangle base line of the former roll axes and the distance apart of said axes.

The feed screw 50 is operated to retract the carrier plate 12 and abutment bar 20 as a whole a convenient distance prior to commencing the lapping operation; then by manipulating the feed screw inwards progressively in small stages the stone is fed inwards against the lapping disc as controlled by the modification of the arcuate path of oscillation of the radial arm 2 by the described means (with the follower roller 15 reciprocating upon the inclined abutment bar 20) and the required blended facet form is generated. The inward feed of the table 5 and stone is arrested when the inward movement of the carrier plate 12 and abutment bar 20 is arrested by the limit stop set by the radius screw 38.

For the gravitational means urging the table 5 towards the lapping plane it is preferred to employ a lever counterweight device comprising a two-armed frame 51 with the counterweight 52 mounted transversely thereon and with the arms extending towards the lapping plane and normal to the vertical axial plane of the axis of the front lower shaft 7 of the parallel link suspension of the table. A fulcrum knife edged bar 53 is mounted transversely on the arms 51 of the counterweight frame adjacent the said lower shaft and supported in notches 54 in a slider 55 which is adjusted with respect to the vertical plane of the lower shaft axis by a manipulable screw 56 in the front casing below the table. Upon the side of the knife edged bar 53 remote from the counterweight, short lever arms 57 carry a contact roller 58 which is adapted to engage the outer race 59 of a ball bearing, the inner race of which is fixed on the front lower shaft. By manipulating the adjustment screw 56, the counterweight device can be set so that the roller 58 can be positioned at different distances from the vertical axial plane of the lower shaft so as to vary the component force of the counterweighted roller acting to thrust the shaft 7, through the ball bearing 59, and the table 5 toward the lapping plane. The slider 55 is seated upon the cross plate or bar 60 which carries the bearing 61 for the sleeve 62 to which the rod 63 is coupled by a frictional drive element. The sleeve 62 is coupled to the spindle 3 by an Oldham type coupling 64.

It will be appreciated that a variety of curved or faceted convex forms can be generated by replacing the former plate and rollers as described above by a cam or a former plate carrying one or more rollers positioned appropriately for the shape to be generated, for which purpose former plates may be interchangeably mounted. Similarly, interchangeable abutment bars may be provided and variations may be produced by using an abutment bar which may be of curved, angular or faceted form on each side of the mid point corresponding with the zero position of the radial arm.

I claim:

1. Mechanism for generating shapes or profiles on stones for industrial tool work or for the jewelry trade by lapping, of the type wherein the stone is held in the dop carried on a radial arm mounted on a pivot, which is displaceable towards or away from the lapping plane, and capable of oscillation to give the dop an arcuate path of movement in a plane normal to the lapping plane of the cutting disc against which the stone is treated, and comprising: a former capable of oscillation with the radial arm; a carriage mounted for movement parallel with and also normal to the lapping plane; a transmission member on the carriage with which the former reacts so that oscillations of the latter displace the carriage parallel with the lapping plane; and a follower and a converting and reducing abutment, one of which is mounted on the carriage and the other on the frame of the mechanism, the arrangement being such that relative traversal of the one upon the other converts the displacements of the carriage parallel with the lapping plane into displacements normal thereto in reduced ratio which are applied to the pivot of the radial arm to modify the arcuate path of the dop thereon according to the predetermined character of the former for the shape or profile to be generated.

2. Mechanism for generating shapes or profiles on stones for industrial tool work or for the jewelry trade by lapping, of the type wherein the stone is held in the dop carried on a radial arm mounted on a pivot, which is displaceable towards or away from the lapping plane, and capable of oscillation to give the dop an arcuate path of movement in a plane normal to the lapping plane of the cutting disc against which the stone is treated, and comprising: a former capable of oscillation with the radial arm; a transmission member engageable by the former and positioned on a carriage, mounted for movement parallel with and also normal to the lapping plane, so that oscillations of the former in contact with the transmission member displace the carriage parallel with the lapping plane; and a follower on the carriage engaged with a track on a reducing and converting abutment carried on the frame of the mechanism and located transversely to the normal to the lapping plane, the arrangement being such that the displacements of the carriage parallel with the lapping plane are converted by the traversal of the follower upon the abutment track into displacements of reduced ratio normal to the lapping plane which are applied to the pivot of the radial arm to modify the arcuate path of the dop according to the predetermined shape or profile to be generated.

3. Mechanism as claimed in claim 2, wherein the former comprises a pair of contact surfaces for engaging the transmission member and positioned parallel with the longitudinal axis of the radial arm so that when such axis is normal to the lapping plane both contact surfaces simultaneously engage the transmission member, thereby providing a manually detectable stable zero position of the arm, and such that movement thereof in either direction of oscillation causes ore or other of the contact surfaces to effect a displacement of the transmission member parallel with the lapping plane.

4. Mechanism as claimed in claim 2, wherein the former is symmetrical about the normal from the radial arm pivotal axis to the transmission member when the radial arm is in the zero position normal to the lapping plane, such that in either direction of oscillation of the arm and former, the transmission member is equally displaced.

5. Mechanism as claimed in claim 1 wherein the reducing abutment has a follower engaging track of curved or angular form.

6. Mechanism as claimed in claim 1 wherein the reducing abutment is adjustably mounted to alter the angularity of its inclined position transverse to the normal to the lapping plane.

7. Mechanism as claimed in claim 2 wherein the reducing abutment is in the form of a bar carried by a pair of sliders independently adjustable by screw-threaded means in paths normal to the lapping plane.

8. Mechanism as claimed in claim 2 wherein the reducing abutment is in the form of a bar carried by a pair of sliders independently adjustable by screw-threaded means in paths normal to the lapping plane, and wherein the slideways and the sliders are mounted on a support which is adjustable normal to the lapping plane by a pair of independent screwthreaded means.

9. Mechanism as claimed in claim 1 and wherein the carriage is connected to a table in which the pivot of the radial arm is mounted and which is supported to swing towards and away from the lapping plane on a parallel link motion.

10. Mechanism as claimed in claim 1 wherein the carriage is connected to a table in which the pivot of the radial arm is mounted and which is supported to swing towards and away from the lapping plane on a parallel link motion, and wherein the table, and hence the radial arm pivot, is urged towards the lapping plane by gravitational force controllably restrained by the action of the oscillating former on the transmission member.

11. Mechanism as claimed in claim 1 and wherein the carriage is connected to a table in which the pivot of the radial arm is mounted and which is supported to swing towards and away from the lapping plane on a parallel link motion, the movement towards the plane being urged by gravitational force operating through a lever weighted on its longer arm and having its shorter arm bearing on the link motion through a roller contact.

12. Mechanism as claimed in claim 1 and wherein the carriage is connected to a table in which the pivot of the radial arm is mounted and which is supported to swing towards and away from the lapping plane on a parallel link motion, the movement towards the plane being urged by gravitational force operating through a lever weighted on its longer arm and having its shorter arm bearing on the link motion through a roller contact, the position of which is adjustable by screw threaded means.

13. Mechanism as claimed in claim 1 wherein the transmission member is resiliently urged into engagement with the oscillating former.

14. Mechanism as claimed in claim 1 wherein the transmission member is resiliently urged into engagement with the oscillating former and manipulative means are provided for temporarily displacing the transmission member out of the path of the former in its oscillations.

15. Mechanism for generating shapes or profiles on stones for industrial tool work or for the jewelry trade by lapping, of the type wherein the stone is held in the dop carried on a radial arm mounted on a pivot, which is displaceable towards or away from the lapping plane, and capable of oscillation to give the dop an arcuate path of movement in a plane normal to the lapping plane of the cutting disc against which the stone is treated, characterised by a former capable of oscillation with the radial arm; a transmission member mounted for engagement with the former and capable of displacements parallel with the lapping plane under the action of the former, and also capable of displacements normal to said plane; a follower operatably associated with the transmission member; an abutment cooperating with the follower for the conversion of the said displacements parallel to the lapping plane into displacements normal to said plane; and means for applying the latter displacements to the pivot of the radial arm for the purpose of modifying the arcuate path of the dop according to the predetermined character of the former for the shape or profile to be generated.

FREDERICK CHARLES JEARUM.